July 1, 1941.    A. BOER    2,247,596

APPARATUS FOR THE ELECTRICAL SEPARATION OF COMMINUTED MATERIALS

Filed April 24, 1939

Inventor
Arpad Boer,
By Wilhelm D. Groff
Attorneys

Patented July 1, 1941

2,247,596

UNITED STATES PATENT OFFICE 2,247,596

APPARATUS FOR THE ELECTRICAL SEPARATION OF COMMINUTED MATERIALS

Arpad Boer, Martinez, Argentina

Application April 24, 1939, Serial No. 269,775
In Rumania May 3, 1938

9 Claims. (Cl. 209—130)

This invention relates to apparatus for the electrical separation of comminuted components from materials such as rocks, minerals, metalliferous and metalloids, mixtures, natural and industrial conglomerates.

The most profitable part of the handling of rocks and minerals, if they are auriferous, is the recovery of gold, which is generally done by means of washing with the use of water. The washing out of the gold is effected with the aid of water, the earthy matters being separated by specific gravity; the water is also necessary for the extraction of gold by the flotation, amalgamation, chlorination and cyaniding systems.

If we examine the part played by water in the separation and extraction of gold by the different methods mentioned above, we find that in most cases it causes important losses of this precious metal when it is separated from the rocks or auriferous ore in finely divided state with the aid of water. Due to capillarity, the finer gold particles remain floating on the surface of the water, which renders it difficult to separate the earthy material, or to form the amalgam with mercury. It is calculated that the loss of gold caused by the use of such processes amounts to between 20% and 40%, depending on the method of separation used.

In the gold extracting systems known heretofore, water plays an indispensable part, and as water is not always available where said precious metal exists, this renders the exploitation difficult. Besides, gold is sometimes found in such finely divided deposits that due to the fact that the mass thereof is so small, relative to its surface, it floats on the water by capillarity and cannot be therefore exploited by the washing or by the amalgamation system.

The main object of the present invention is to separate the comminuted components of materials, such as rocks, ores, metalliferous and metalloids, mixtures, natural and industrial conglomerates and the like, and also the separation of native gold, from other accompanying materials, electrically and in the dry state, viz.; without the use of water or other liquids.

The materials to be separated, finely ground to the state of fine powder, are passed through an ionized electric field, where each particle receives a determined electrical discharge, and by means of electrodes having different electric voltages, are classified according to the mass, specific gravity and electric charge thereof.

In order that the invention may be more clearly understood and readily carried into practice, the same has been illustrated by way of example and in a preferred embodiment in the accompanying drawing, although the polarizing and separating units may be applied in series or in parallel, or modified as regards their shape, location or relative position to improve the separation, without departing from the scope of the invention as clearly set forth in the appended claims.

Figure 1:
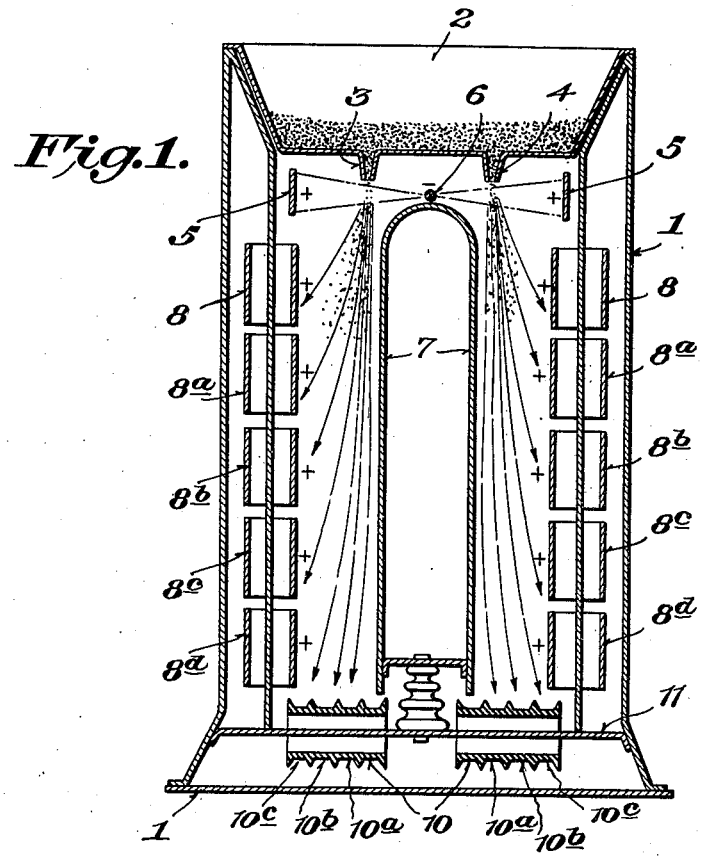
Figure 1 is a vertical sectional view of the electric separator.
Figure 2:
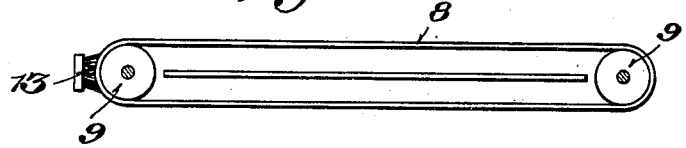
Figure 2 is a pain view of the metallic endless bands or belts charged with a high electric voltage, for separating the particles, and the corresponding brush thereof for removing the adhered material.
Figure 3:
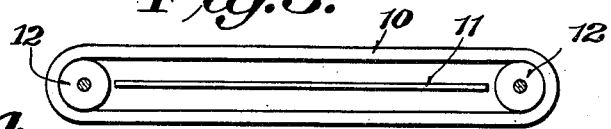
Figure 3 is a side view of the bottom rotary band for classifying and conveying the materials which, due to its weight and specific gravity, that is to say, as a result of gravitation, have overcome the forces of the electric fields and fallen to the bottom.

In the selecting plant shown in Figures 1 to 3 the apparatus is constituted by a frame 1, supporting at the upper end thereof a vessel or hopper 2 for receiving the material to be separated, already in a finely ground and dry state, which through a vibratory movement given to the said deposit, is caused to uniformly fall through deep and narrow openings 3 and 4 formed in the bottom of said container, from where the particles drop of their own weight into a second vessel, which constitutes an ionization chamber.

In the interior and upper portion of said ionizing vessel, and towards both sides thereof, are two metal plates 5 forming a positive electrode and having a relatively larger surface than the metal rod 6 which forms the negative electrode, both of said electrodes being connected to a 25,000 volt direct current generator. Negative electrode 6 may be advantageously heated.

In this manner, the electrostatic force of the plates 5 charged with positive high tension voltage causes the discharge from the negative rod 6 of electron charges which tend to reach said positive plates 5, whereby the electric field between the positive plates and the negative rod reaches a high ionization.

The particles of mineral material to be separated falling from the openings 3 and 4 must necessarily pass through said ionized field, taking a negative charge due to the adhering electrons.

As these particles of material continue to fall by gravity, they reach a second electric field formed between the central plate 7, as the negative electrode, and the metal bands or bells 8, 8a, 8b, 8c and 8d as positive electrodes which are located at the sides and extend between the guiding and driving rollers or pulleys 9 serving to keep said band electrodes in a horizontal position and tranversely of the apparatus. Through suitable means, said rollers or pulleys may receive a rotary motion for running the bands around these rollers.

The central plate 7 as the negative electrode and the bands or belts 8, 8a, 8b, 8c and 8d as positive electrodes are connected to a direct current generator, for example a 10,000 volt generator.

Upon falling, the particles charged with negative electricity are rejected by the negative charge of central plate 7, while the travelling metal bands or belts having positive electric charge tend to attract said particles. Certain of the polarized particles, according to their mass, specific gravity, generally the metalloids, soon are attracted by the positive charge of the metal bands 8, 8a, 8b, 8c and 8d, to the surface of which they adhere, since this positive charge applies a force stronger than gravity.

The remaining particles which due to the magnitude of their weight, specific gravity and electric charge, do not adhere to the positively charged belts or bands, overcoming the attraction forces of the latter, are deposited on horizontal travelling rubber bands or belts 10, 10a, 10b, 10c located longitudinally on the lower portion 11 of the apparatus and suitably guided by pulleys or rollers 12.

The particles adhered to the metal bands may be removed therefrom by means of brushes 13, as shown in Figure 2, arranged in a fixed or rotary manner.

The apparatus and process as described above not only effect a classification between metalloids and metals, but also between the different kinds thereof.

By repeating this operation for each of the materials deposited on the sections 10, 10a, 10b and 10c, which are classified by specific gravity and mass in a graded manner, the section 10 receiving the larger particles which due to their mass and specific gravity were not attracted by the travelling belts, the separation of precious metals will be obtained without the losses caused by washing, floating or chemical methods.

Figure 4:
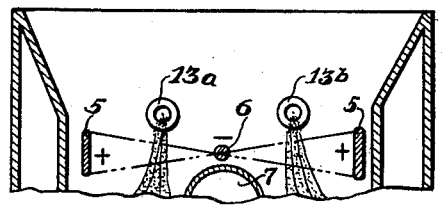
Fig. 4 shows a modified form of the invention wherein the comminuted material is introduced horizontally in a jet of air.

The process or plant described above may be modified in such a manner that the particles are introduced in the ionized field by means of a horizontally directed current of air, as shown at 13a, 13b in Fig. 4, when the factors of momentum, received by the current of air, gravity, determined electric charge of the particles, forces of the high tension electric field, cause the classification of the materials according to their mass and density.

It is evident that several modifications in construction and detail may be introduced in the apparatus described above, without departing from the scope of the present invention as clearly set forth in the appended claims.

What I claim is:

1. In an apparatus for sorting mixed comminuted materials, a hopper for containing said materials and being provided with a base orifice for discharging said materials in a stream falling downwardly therefrom, a pair of ionizing electrodes positioned on opposite sides of said falling stream below said orifice, a common long vertical separating electrode positioned on one side of said falling stream of materials, a plurality of individual separating electrodes arranged in a vertical row on the side of said stream opposite said common separating electrode and comprising means for removing materials electrostatically adhering thereto, and means for applying a high electrical voltage between said ionizing electrodes and between said separating electrodes, said separating electrodes being positioned below said ionizing electrodes.

2. An apparatus according to claim 1, said individual separating electrodes being endless electrically conducting vertically positioned belts, and means for continuously moving said belts in a direction substantially perpendicular to the vertical plane passing through said common separating electrode and said falling stream.

3. An apparatus according to claim 1, said voltage applied between said ionizing electrodes being of the order of twice as great as the voltage applied between said separating electrodes.

4. An apparatus according to claim 1, said individual separating electrodes being endless electrically conducting vertically positioned belts, and means for continuously moving said belts in a direction substantially perpendicular to the vertical plane passing through said common separating electrode and said falling stream, different voltages being applied respectively between each of said individual separating electrodes and said common separating electrode.

5. An apparatus according to claim 1, and a channelled belt positioned below said separating electrodes, and means for continuously moving said channelled belt substantially in a direction perpendicular to the plane passing through said common separating electrode and said falling stream and substantially beneath the space between said separating electrodes through which said stream falls.

6. In an apparatus for sorting mixed comminuted materials, a hopper for containing said materials and being provided in the base thereof with a pair of spaced orifices for discharging said materials in a pair of streams falling continuously therefrom, a central common ionizing electrode positioned below and between said orifices, a pair of lateral ionizing electrodes respectively positioned on the side of each of said streams opposite said central ionizing electrode, a relatively long and large plate mounted vertically between said falling streams and constituting a central common separating electrode, a pair of sets of individual separating electrodes, each of said sets comprising a plurality of individual separating electrodes arranged in a vertical row and comprising means for removing materials electrostatically adhering thereto, said sets being respectively arranged on the side of each of said streams opposite said central common separating electrode, said separating electrodes being positioned below said ionizing electrodes, and means for applying a high electrical voltage between said ionizing electrodes and between said separating electrodes.

7. An apparatus according to claim 6, said individual separating electrodes being endless electrically conducting vertically positioned belts, and means for continuously moving said belts in a direction substantially perpendicular to the vertical plane passing through said central common separating electrode and the falling stream adjacent said belt.

8. An apparatus according to claim 6, said voltage applied between said ionizing electrodes being of the order of twice as great as the voltage applied between said separating electrodes.

9. An apparatus according to claim 1, the negative one of said ionizing electrodes being heated.

ARPAD BOER.